United States Patent [19]
Bernadic et al.

[11] Patent Number: 5,249,894
[45] Date of Patent: Oct. 5, 1993

[54] HIGH SHEER, ULTRA LIGHT DUTY INSERT

[75] Inventors: Thomas J. Bernadic, Madison Heights; Brendan L. Brockett, Dearborn Heights; Robert Racklyeft, Lincoln Park, all of Mich.

[73] Assignee: GTE Valenite Corporation, Troy, Mich.

[21] Appl. No.: 986,203

[22] Filed: Dec. 7, 1992

[51] Int. Cl.$^5$ .......................... B23B 27/22; B23C 5/20
[52] U.S. Cl. .................................... 407/114; D15/139
[58] Field of Search ............... 407/113, 114, 115, 116; D15/139

[56] References Cited

U.S. PATENT DOCUMENTS

| D. 324,690 | 3/1992 | Takahashi et al. | D15/139 |
| 4,411,565 | 10/1983 | Hazra et al. | 407/114 |
| 4,606,679 | 8/1986 | Jeremias | 407/114 |
| 4,705,434 | 11/1987 | Patterson et al. | 407/114 |
| 5,000,626 | 3/1991 | Bernadic et al. | 407/114 |
| 5,116,167 | 5/1992 | Niebauer | 407/114 |

Primary Examiner—William E. Terrell
Attorney, Agent, or Firm—Bill C. Panagos

[57] ABSTRACT

An ultra light duty polygonal lay down indexable insert having a scalloped shaped island symmetrically disposed on the top or bottom surface of the insert.

10 Claims, 3 Drawing Sheets

HIGH SHEER, ULTRA LIGHT DUTY INSERT

BACKGROUND OF THE INVENTION

The present invention relates to a high sheer, ultra light duty insert for cutting ductile material such as steel at moderate to high cutting speeds and at the low range of feed rates and depth of cuts.

The present invention further relates to an insert for finishing and backfacing which gives excellent chip control at moderate to high cutting speeds and at the low range of feed rates and depth of cuts.

The present invention further relates to metal cutting inserts which utilize two step chip breaker designs to impart stress and strain to the chip and achieve excellent chip control at moderate to high rates of speed and the low range of feed rates and depth of cuts.

SUMMARY OF THE INVENTION

The present invention is directed to a high speed, ultra light duty polygonal lay down indexable cutting insert. The insert has a top and bottom surface substantially parallel to each other and a side wall normal to said top and bottom surface running substantially unbroken therebetween to define a body. The side wall is comprised of flank portions which are defined as that portion of the side wall which extends from corner to corner of the insert. At least one, and preferably all, of the corners are designated as nose portions of the insert. The insert has a cutting edge defined by the intersection of said sidewall with said top or bottom surface, a first descending land surface rearward of said cutting surface, a second descending land surface along the flanks of the insert only which is oriented at a greater angle than the first descending land surface, and at least one, and preferably two arcuate ascending land surfaces rearward of said second descending land along the flanks of the insert. Each arcuate ascending land surface extends from the nose portion adjacent to said first descending land surface to the mid-point of each flank of the insert and is spaced apart from the first descending land surface. At each nose portions there is a first ascending land surface rearward of said descending land surface followed by a neutral land surface. Rearward of the neutral land surface is a second ascending land surface which meets the top surface of the insert. The insert thus has an island formed which has arcuate shaped sides. The insert has a centrally located aperture extending from the top to the bottom surface through the insert body. The aperture is surrounded by a recessed pad area which enhances the appearance of the insert and further reduces the grind area and further reduces the warpage the insert may be subjected to.

DETAILED DESCRIPTION OF THE DRAWINGS

Figure 1:
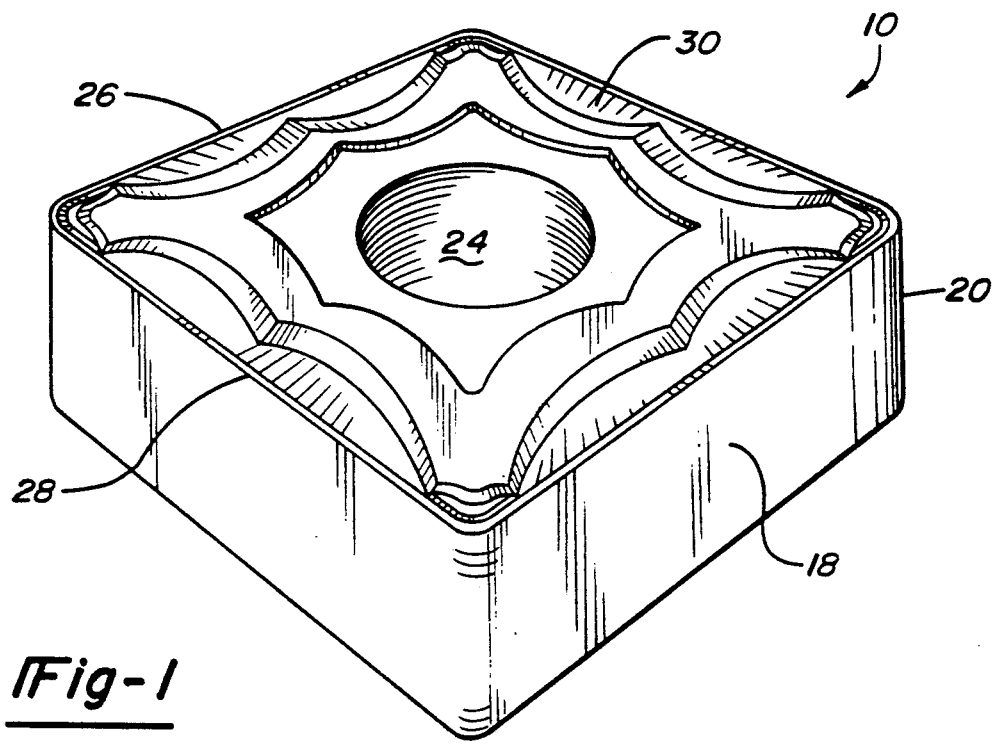
FIG. 1 is a perspective view of the insert of the present invention.

Turning now to the Figures, wherein like numerals depict like structures, polygonal insert 10 has top surface 12 and bottom surface 14 which are substantially parallel to each other, separated by sidewall 16, which is normal to the top and bottom surface, to form body 22. The side wall is comprised of side flanks 18, defined by the portion of the sidewall extending from one corner 20 to an adjacent corner of the insert. The intersection of the top or bottom surface and the sidewall forms cutting edge 26, which extend around the entire perimeter of the insert. Rearward of the cutting edge is descending land surface 28, which extends around the entire perimeter of the insert. The descending land surface has an angle of about 15 to 18 degrees, and preferably is 17 degrees. Along the flank portion of the insert, a second descending land surface 30 is inclined at an even greater angle. FIG. 4 is a cross sectional view taken along line 4—4 seen in FIG. 3. Second descending land surface 30 has an angle of about 28 degrees, and intersects with first ascending incident land surface 36. The intersection forms a chip breaker groove 31, which allows for good chip control during metal cutting operations. Also, the first ascending incident land surface has an angle of about 30 to 35 degrees, and preferably 30 degrees at the flanks. Because the incident surface 36 is scalloped or curved, surface 44, is visible in the cross sectional view.

Figure 3:
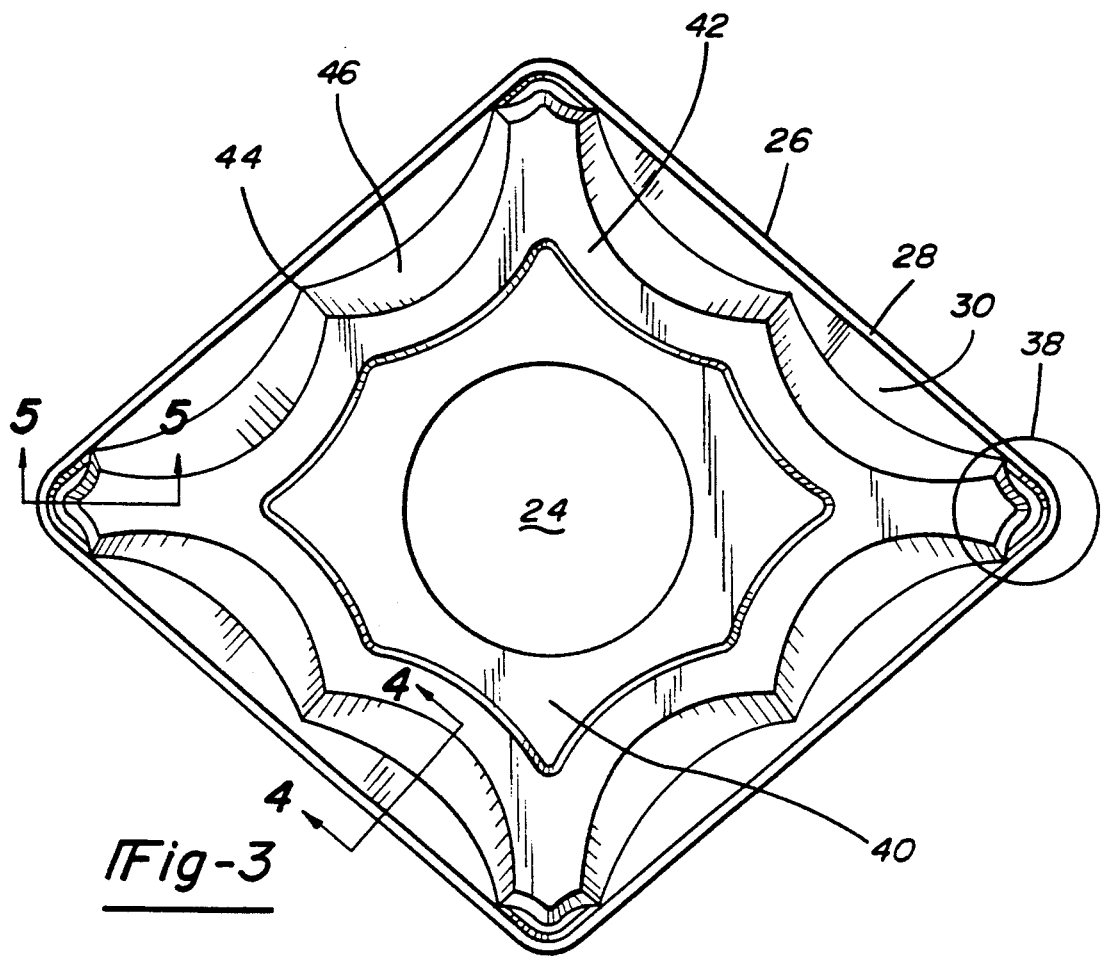
FIG. 3 is a top plan view of the insert of the present invention.
Figure 4:
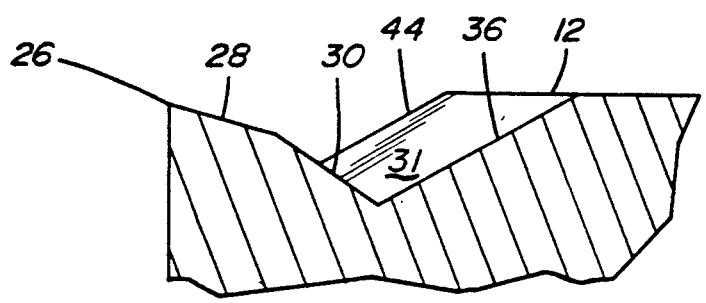
FIG. 4 is a detail cross sectional view of the insert taken through line 4—4 of the insert of FIG. 3.
Figure 5:
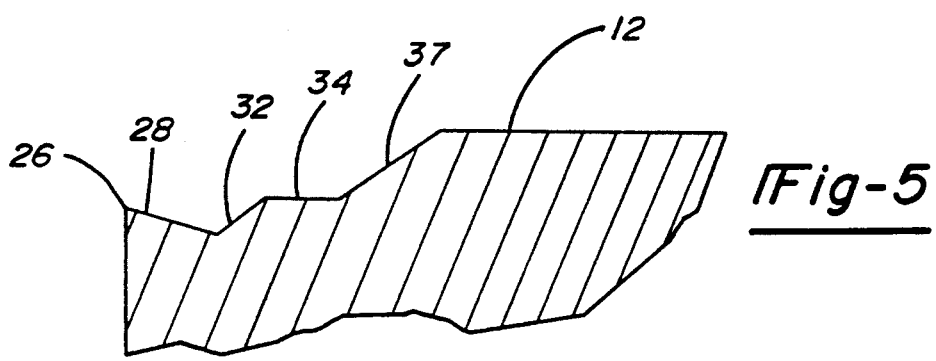
FIG. 5 is a detailed cross sectional view of the insert taken through line 5—5 of the insert of FIG. 3.
Figure 6:
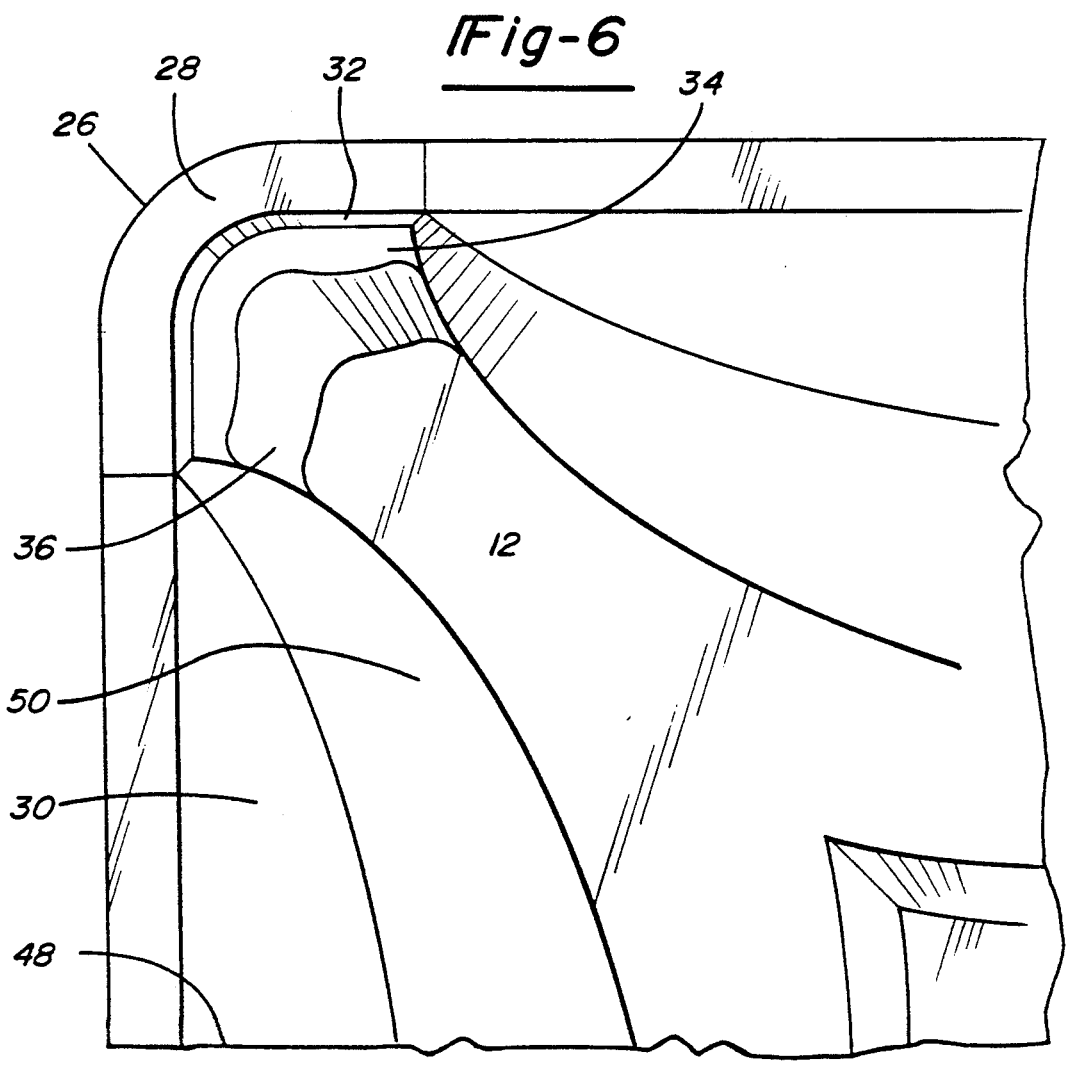
FIG. 6 is a detailed view of the nose portion of FIG. 3.

Turning now to FIGS. 3, 5 and 6, nose section 38, when seen along line 5—5, has cutting edge 26, and rearward of the cutting edge is the descending land surface 28. Rearward of the descending land surface is a first ascending land surface 32, followed by a neutral land 34, which is followed by a second ascending land surface 37. Second ascending land surface and first incident ascending surface 36 may have the same angle or may be different, and preferably is in the range of 30 to 35 degrees.

Figure 2:
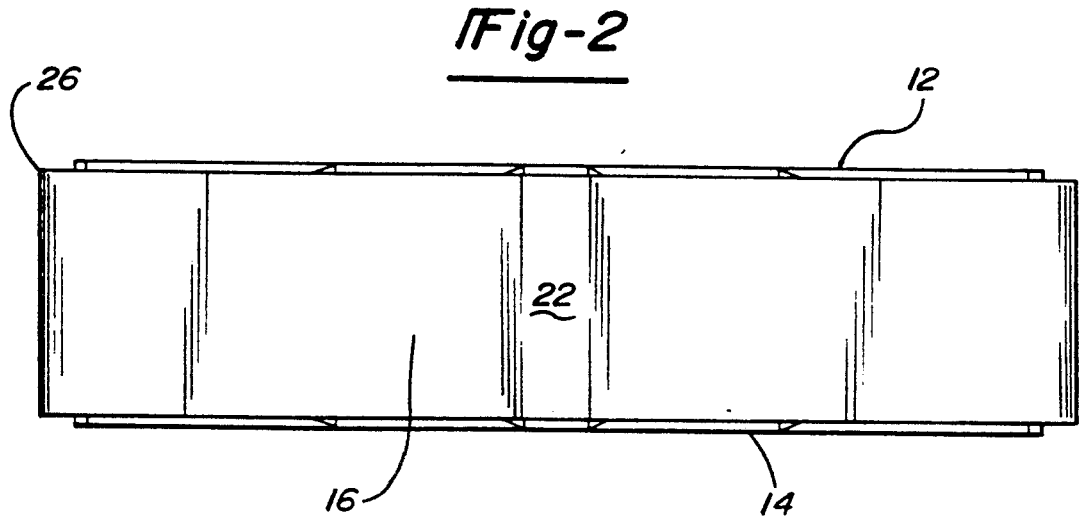
FIG. 2 is a side view of the insert of the present invention.

Turning back to FIGS. 1, 2 and 3, it can be seen that there is an island 42 having scalloped areas 46 along the flanks of the insert. It is important to this design that the scallops intersect the descending land surface 28 at each nose and arcuately travel along the flank portions of the insert. At the midpoint of the insert, the arcuate surface 46 terminates at a point spaced apart from the descending land surface, preferably, the scalloped areas are symmetrical to the shape of the insert. The island is raised above the cutting edge, preferably by 0.010 inches.

The island 42 is further provided with a recessed pad area 40, which reduces warpage and grinding. Moreover, the recessed pad allows for more stable seating of the insert in a tool holder. Finally, a centrally located aperture 24 extends from the top to the bottom surface through the body of the insert to allow a screw of other means to clamp the insert in place.

The insert of the present invention is designed to be used at a feed rate of 0.002 to 0.012 IPR and at a depth of cut of about 0.005 to 0.10 inches.

We claim:

1. A high sheer, ultra light duty polygonal lay down indexable cutting insert to machine ductile material at moderate to high cutting speeds at low ranges of feed and depths of cut, comprising:

a top surface and a bottom surface substantially parallel to each other and separated by a sidewall running substantially unbroken therebetween to define a body; said side wall comprised of flank portions which extend from corner to corner of the insert; at least one of said corners defining a nose portion of the insert; a cutting edge defined by the intersection of said top or bottom surface with said sidewall; a first descending land surface rearward of said cutting edge, said first ascending land surface being of uniform width and extending about the entire perimeter of said insert body; a second descending land surface rearward of said first descending land surface extending along said flanks of said insert only; said second ascending land surface oriented at an angle greater than said first descending land surface; at least one arcuate shaped flank ascending land surface rearward of said second descending land surface along each flank of the insert; each said arcuate ascending incident land surface extending from the nose portion adjacent said first descending land surface to the midpoint of the flank of the insert spaced apart from said first descending land surface; a first ascending land surface rearward of said descending land surface at the nose portions of the insert; a neutral land surface rearward said first ascending land surface; and a second ascending land surface at said nose portion rearward of said neutral land surface extending to said top surface; a scalloped shaped island and a centrally located aperture extending through said body; said aperture surrounded by a recessed pad area.

2. The insert of claim 1, wherein said descending land surface has an angle in the range of about 17 degrees.

3. The insert of claim 1, wherein said second descending land surface has an angle of about 28 degrees.

4. The insert of claim 1, wherein said ascending scalloped land surface had an angle of about 30 degrees.

5. The insert of claim 1, wherein said first descending land surface has a width of about 0.008 inches.

6. The insert of claim 1, wherein said first ascending land surface at the nose portion of the insert has an angle of about 45 degrees.

7. The insert of claim 1, wherein said neutral land surface at the nose of the insert is raised 0.001 inches above the cutting edge.

8. The insert of claim 1, wherein said second ascending land surface at the nose has an angle in the range of about 30 to 35 degrees.

9. The insert of claim 1, wherein each flank has two arcuate shaped flank ascending surfaces symmetrically disposed per flank portion of the insert.

10. The insert of claim I, wherein each corner is a nose portion.

* * * * *